(12) United States Patent
Weber et al.

(10) Patent No.: US 10,436,052 B2
(45) Date of Patent: Oct. 8, 2019

(54) LEAF SEAL FOR SEALING OFF A SHAFT ROTATING AROUND AN AXIS

(71) Applicant: MTU Aero Engines AG, Munich (DE)

(72) Inventors: Julian Weber, Munich (DE); Christoph Cernay, Bruckmuehl (DE); Thomas Hess, Munich (DE)

(73) Assignee: MTU Aero Engines AG, Munich (DE)

( * ) Notice: Subject to any disclaimer, the term of this patent is extended or adjusted under 35 U.S.C. 154(b) by 334 days.

(21) Appl. No.: 14/814,326

(22) Filed: Jul. 30, 2015

(65) Prior Publication Data
US 2016/0032749 A1 Feb. 4, 2016

(30) Foreign Application Priority Data
Jul. 31, 2014 (EP) .................... 14179331

(51) Int. Cl.
| | | |
|---|---|---|
| *F01D 11/00* | (2006.01) | |
| *F01D 5/02* | (2006.01) | |
| *F01D 25/24* | (2006.01) | |
| *B22F 3/105* | (2006.01) | |
| *F16J 15/3292* | (2016.01) | |
| *B33Y 10/00* | (2015.01) | |

(52) U.S. Cl.
CPC .......... *F01D 11/005* (2013.01); *B22F 3/1055* (2013.01); *F01D 5/02* (2013.01); *F01D 11/001* (2013.01); *F01D 11/003* (2013.01); *F01D 25/24* (2013.01); *F16J 15/3292* (2013.01); *B33Y 10/00* (2014.12); *F05D 2220/32* (2013.01); *F05D 2240/57* (2013.01); *F05D 2240/59* (2013.01)

(58) Field of Classification Search
CPC ... F01D 11/003; F01D 11/005; F16J 15/3288; F16J 15/3292
See application file for complete search history.

(56) References Cited

U.S. PATENT DOCUMENTS

| | | | |
|---|---|---|---|
| 4,526,509 A * | 7/1985 | Gay, Jr. ............... | F01D 11/12 277/413 |
| 5,031,922 A | 7/1991 | Heydrich | |
| 5,755,445 A | 5/1998 | Arora | |
| 6,736,401 B2 * | 5/2004 | Chung ............... | F01D 9/023 277/355 |

(Continued)

FOREIGN PATENT DOCUMENTS

| | | |
|---|---|---|
| DE | 10 2004 020 378 A1 | 11/2005 |
| DE | 10 2010 054 113 A1 | 6/2012 |

(Continued)

OTHER PUBLICATIONS

Extended European Search Report dated Feb. 4, 2015, with partial English translation (Seven (7) pages).

(Continued)

*Primary Examiner* — Igor Kershteyn
*Assistant Examiner* — John S Hunter, Jr.
(74) *Attorney, Agent, or Firm* — Crowell & Moring LLP

(57) ABSTRACT

A leaf seal for sealing off a shaft rotating around an axis, particularly in a gas turbine, is disclosed. The leaf seal includes a plurality of leaves arranged spaced apart from one another, where the leaves are produced integrally with a basic element supporting the leaves by a generative production process. A process for producing a leaf seal for sealing off a shaft rotating around an axis is also disclosed.

8 Claims, 4 Drawing Sheets

(56) References Cited

U.S. PATENT DOCUMENTS

| | | | |
|---|---|---|---|
| 7,077,573 B2* | 7/2006 | Suh | F16C 27/02 |
| | | | 277/355 |
| 7,735,833 B2* | 6/2010 | Braun | F01D 11/003 |
| | | | 277/301 |
| 7,744,093 B2* | 6/2010 | McMillan | F01D 11/003 |
| | | | 277/355 |
| 8,025,296 B2* | 9/2011 | Uehara | F01D 11/00 |
| | | | 277/355 |
| 8,333,544 B1* | 12/2012 | Pelfrey | F01D 11/001 |
| | | | 415/1 |
| 2003/0174918 A1 | 9/2003 | Suh et al. | |

FOREIGN PATENT DOCUMENTS

| | | |
|---|---|---|
| EP | 1 271 021 A1 | 1/2003 |
| EP | 1 365 181 A2 | 11/2003 |
| EP | 2 325 442 A1 | 5/2011 |

OTHER PUBLICATIONS

German-language Office Action issued in counterpart German Application No. 14179331.5 dated Dec. 3, 2018 (five (5) pages).

* cited by examiner

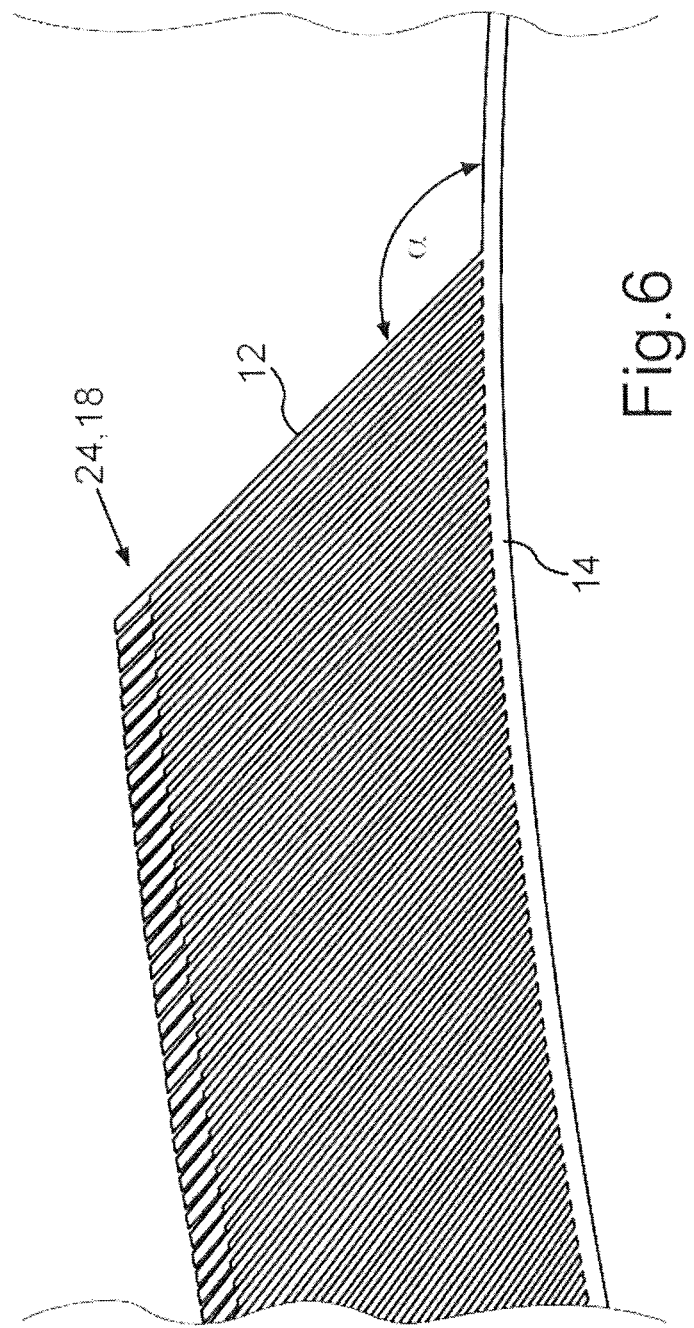

LEAF SEAL FOR SEALING OFF A SHAFT ROTATING AROUND AN AXIS

This application claims the priority of European Patent Application No. EP 14179331.5, filed Jul. 31, 2014, the disclosure of which is expressly incorporated by reference herein.

BACKGROUND AND SUMMARY OF THE INVENTION

The invention relates to a leaf seal for sealing off a shaft rotating around an axis, particularly in a gas turbine. The invention further relates to a gas turbine having such type of leaf seal as well as a process for producing such type of leaf seal.

Various seals can be used for sealing off gaps. For example, brush seals are often used in engine construction in order to seal off gaps between a rotor and a stator. Due to their mechanical integrity, brush seals are contact seals that themselves are subject to wear as are their friction partner during operation. In addition, brush seals can only be used up to a differential pressure of about 12 bar.

Leaf seals, which can be used in environments with very high pressure differences and which furthermore take longer to exhibit wear than brush seals due to their axial stiffness, offer a solution to this problem. One such type of leaf seal is known, for example, from German Patent Document DE 10 2004 020 378 A1 and comprises a plurality of leaves, which are connected to one another through electron beam welding. Alternatively, it is known to thread the individual leaves of a leaf seal separately into a corresponding receptacle of the housing.

Both structural types are, however, very complex and extremely expensive, because leaf seals in the engine sector, for example, may comprise up to 4000 leaves or more. Due to the comparably delicate design of the individual leaves, the known leaf seals also cannot be prefabricated in a practical overall size for engine applications and cannot be adapted to different installation situations, or can only be done so at great expense. In addition, a correspondingly great deal of effort is required in order to ensure sufficient reproducibility of such individually produced leaf seals.

The object of the present invention is to obtain a leaf seal of the aforementioned type, which is simple to produce and simple to adapt to various installation situations. A further object of the invention is the provision of a process for producing the leaf seal.

A first aspect of the invention relates to a leaf seal for sealing off a shaft rotating around an axis, particularly in a gas turbine, comprising a plurality of leaves arranged spaced apart from one another, in which a provision according to the invention is that the leaves are produced integrally with a basic element supporting the leaves by a generative production process. In other words, different from the prior art, a provision is that the leaf seal is generatively produced, in which the individual leaves are connected to one another by a basic element. This makes the leaf seal according to the invention quicker and easier to produce. Furthermore, the generative production enables much design freedom and flexibility, which means that the leaf seal according to the invention can also be easily adapted to different installation situations. The integral design enables, for example, simple modification of the intervals between individual leaves or sealing elements, so that the leaf seal can be quickly and simply adapted to any preferred shaft diameter or to any gap geometry. In addition, the stiffness of any individual leaf can be infinitely adapted to the requirements at hand. In particular, the generative production enables a very large spectrum of leaf thicknesses, which means that the individual leaves can have thicknesses between 0.1 mm and 4 mm, for example, regardless of the average thicknesses among one another. It is also possible for the radial design height of each individual leaf as well as the individual distances between adjacent leaves to be optimally adapted to the individual installation situation. Regardless of this, the shape or the geometry of the individual leaves can be optimally adapted to the individual requirements. In addition to adjusting the individual geometry, it is also possible to vary the material used within the scope of the generative production process once or multiple times in order to selectively adjust certain properties of the leaf seal. Finally, the basic element can also be formed independently of the leaves. For example, the basic element can be formed as a shroud, which is produced as an integral unit together with the leaves and can be installed in any housing configurations as a leaf seal. In particular, very large or very small sizes can also be produced with generative production. Due to the integral design, the tolerances are also significantly lower than with the previously known leaf seals. In addition, the assembly time of the leaf seal is reduced significantly, because no leaf seals have to be threaded in or welded due to the integral design. Instead, the entire leaf seal can be integrally produced and, in the simplest case, directly installed without further processing steps. This enables costs to be reduced by a factor of 10 or more. The generative production method additionally increases the reproducibility of the leaf seal.

In an advantageous embodiment of the invention, a provision is that at least one leaf has a nonuniform cross-sectional geometry. In other words, a provision is that one, more, or all leaves have a nonuniform cross-sectional geometry. For example, one or more local thickening and/or thinning areas may be provided on each leaf. In this manner, the elastic bending behavior of each leaf can be optimally adjusted, for example.

Additional advantages result in that at least one leaf has a reduced cross-sectional thickness in the area of the basic element. Such type of recess facilitates relative tipping of the particular leaf with respect to the basic element, so that improved contact can be achieved at an assigned shaft and thus an improved sealing effect. Basically, multiple or all leaves of such type can be formed.

Alternatively or in addition to this, a provision may be that at least one leaf includes a spacer element for adjusting a minimum distance to an adjacent leaf. This enables the adjustment of a minimum gap between two adjacent leaves and thus a defined minimum porousness of the leaf seal for operating fluid. The spacer element can be formed, in the simplest embodiment, as a thickened area of the leaf, for example, and preferably formed on the basic element opposite the end area of the leaf.

Other possibilities for individual adjustment of the sealing effect and the geometry of the leaf seal are enabled in that at least one leaf is arranged at a predetermined placement angle and/or at a predetermined adjustment angle with regard to a longitudinal axis of the basic element. In other words, the tilt angle of the leaf and/or the angle between the longitudinal axis of the basic element and the vein of the particular leaf can be essentially freely selected. The tilt angle and/or the angle between the longitudinal axis of the basic element and the vein of the particular leaf can thus take on values, independently from one another, for example of 5°, 10°, 15°, 20°, 25°, 30°, 35°, 40°, 45°, 50°, 55°, 60°, 65°, 70°, 75°, 80°, 85°, or 90°, as well as corresponding intermediate values.

In another advantageous embodiment of the invention, a provision is that the basic element includes at least one fastener for fastening the leaf seal to a component, particularly to a housing part. This enables a particularly simple adaptability of the leaf seal to various housing types, because the geometry and arrangement of the fastener may also essentially be freely selected.

In another advantageous embodiment of the invention, a provision is that the at least one fastener is arranged on a side of the basic element facing away from the leaves. This enables particularly easy fastening of the leaf seal and assigned mount.

In another advantageous embodiment of the invention, a provision is that the at least one fastener be produced integrally with the basic element by the generative production process. Although it is essentially of course also conceivable for the at least one fastener to be subsequently placed on the basic element, the integral production of the at least one fastener to the basic element represents a particularly simple and quick design option for equipping the basic element with the at least one fastener.

Additional advantages result in that at least one leaf has a winglet at its upstream and/or downstream end area. In other words, a provision according to the invention is that at least one, more, or all leaves have an upstream and/or downstream end area, regarding a subsequent installation situation, which is arranged at an adjustment angle with respect to the adjacent leaf area. Such winglets advantageously increase the sealing effect of the leaf seal, because they partially block straight-line passageway for the gas flow in the axial direction, but do not seal it off completely. The gas flow is instead rerouted through the winglet or through the winglets, so that a type of labyrinth seal results.

Additional advantages result in that the basic element and/or at least one seal includes at least one recess. In addition to weight optimization of the leaf seal, this also enables the assurance of even pressure distribution as well as the adaptation of basic stiffness of the leaf (or leaves) or of the basic element.

In another advantageous embodiment of the invention, a provision is that the basic element be formed so as to be elastically deformable and/or shaped as an annular segment in the longitudinal section. This enables a particularly simple and quick assembly of the leaf seal in a cylindrical gap, particularly in a gas turbine.

A further aspect of the invention relates to a gas turbine, particularly an aircraft engine, having a housing, in which at least one leaf seal is arranged around a rotor according to one of the preceding exemplary embodiments, in order to reduce a flow of fluid from a high-pressure side to a low-pressure side of the rotor. The resulting features and the advantages thereof are contained in the previous descriptions of the first aspect of the invention, in which advantageous embodiments of the leaf seal can be considered advantageous embodiments of the gas turbine and vice versa.

The sealing effect can be significantly increased in a simple and economical manner in that at least two leaf seals are provided according to the first aspect of the invention and preferably offset in the axial direction with respect to a rotational axis of the rotor, arranged one after the other. The sealing effect can be particularly precisely adjusted in addition due to the level of the relative offsetting with respect to one another. In doing so, it can essentially be provided that the at least two leaf seals be initially produced as a single piece by the generative production process. If necessary, the single-piece leaf seal can subsequently be divided into two or more individual leaf seals.

A third aspect of the invention relates to a process for producing a leaf seal for sealing off a shaft rotating around an axis, particularly in a gas turbine, in which the leaf seal includes a plurality of leaves arranged spaced apart from one another. In doing so, a provision according to the invention is that the leaves be produced integrally together with a basic element supporting the leaves by a generative production process. The resulting features and the advantages thereof are contained in the preceding descriptions of the first and the second aspect of the invention, in which advantageous embodiments of the leaf seal and/or of the gas turbine can be considered advantageous embodiments of the process according to the invention and vice versa. The process according to the invention in this case is essentially not limited to a certain generative production process. For example, known generative processes such as selective laser melting (SLM), direct metal laser sintering (DMLS), and/or electron beam processes can be used.

In an advantageous embodiment of the invention, a provision is that a support structure be formed on the leaf seal during the generative production process and be preferably subsequently removed. With the assistance of a support structure, particularly damage to the leaves is advantageously avoided during the generative production process. The support structure can be formed on an end area of the leaves opposite the basic element and preferably then removed after production of the leaf seal.

Additional features of the invention result from the claims, the exemplary embodiments, and the drawings. The features and feature combinations listed previously in the description as well as the features and feature combinations listed in the exemplary embodiment in the following can be used not only in the respectively indicated combination, but also in other combinations, without going beyond the scope of the invention.

BRIEF DESCRIPTION OF THE DRAWINGS

FIG. 6 shows a schematic side view of another exemplary embodiment of the leaf seal according to the invention in which the support structure shown in FIG. 1 has been removed.

BRIEF DESCRIPTION OF THE DRAWINGS

Figure 1:
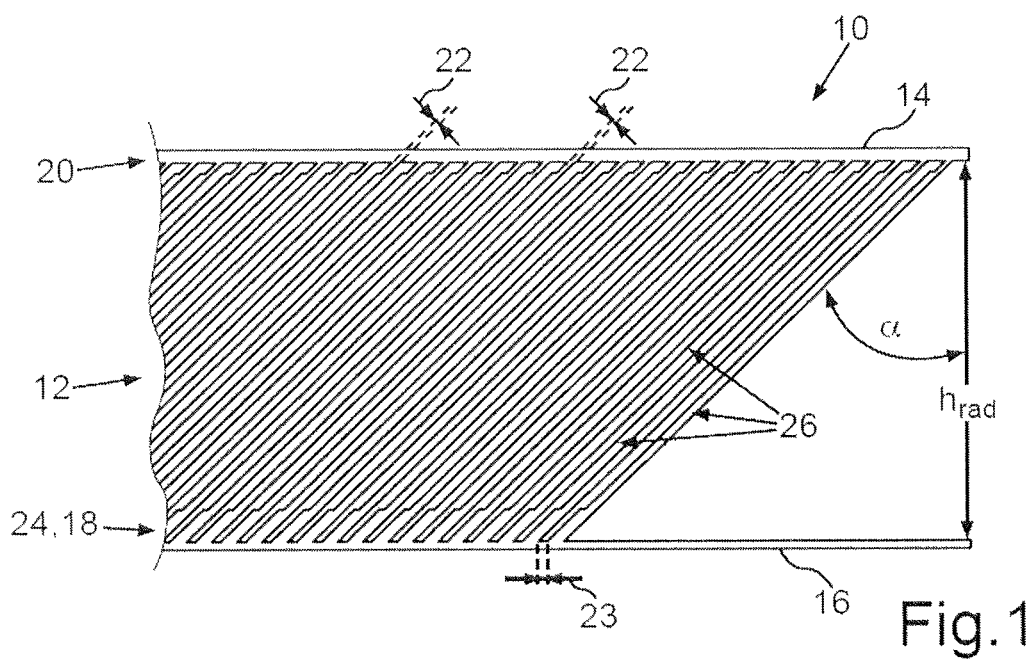
FIG. 1 shows a schematic side view of a leaf seal according to the invention, which was produced together with a support structure.

FIG. 1 shows an exemplary embodiment of a leaf seal 10 according to the invention for sealing off a rotor of an aircraft engine. The leaf seal 10 includes a plurality of leaves 12 arranged spaced apart from one another, which are produced integrally with a basic element 14 supporting the leaves 12 by a generative production process. The basic element 14 is formed as an outer shroud in this case and can be executed specifically according to the installation space of the application. It can be further seen that a leaf-shaped support structure 16 is produced at an end area 18 of the leaves 12 opposite the basic element 14 during the generative production process in order to protect the leaves 12 from damage. As can be seen, for example, in FIG. 2 to FIG. 5, the support structure 16 is removed before installation of the leaf seal 10, so that the affixing of the end areas 18 of the leaves 12 is omitted. As can be seen in FIG. 1, various parameters of the leaf seal 10 can be freely adjusted in order to adjust the geometry, stiffness, and sealing effect of the leaf seal 10. For example, the average leaf and cross-sectional thickness of the individual leaves 12 can be selected independently of one another and varied in a range of about 0.1 mm to about 4 mm. It can be further seen that the leaves 12 have recesses or reduced cross-sectional thicknesses 22 in their end area 20 facing toward the basic element 14, whereby a relative tilting of the leaves 12 is facilitated opposite the basic element 14. Likewise, the distance 23 between the individual leaves 12, the placement angle α, and the radial height $h_{rad}$ can be freely adjusted. In the exemplary embodiment shown, the leaves 12 have an adjustment angle of 90° (not shown) with respect to a longitudinal axis of the basic element 14, whereby they have an adjustment angle of 0° with respect to the flow of gas in an aircraft engine when installed. This adjustment angle can also essentially be freely adjusted and may be, for example, 5°, 10°, 15°, or more in order to adapt to the sealing effect of the leaf seal 10. Furthermore, the leaves 12 include spacer elements 24 at their end areas 18 in order to adjust a minimum distance between leaves 12 adjacent to one another. The spacer elements 24 are formed by cross-sectional thickness areas in the exemplary embodiment shown and cause the formation of defined gaps 26 between the individual leaves 12.

Figure 2:
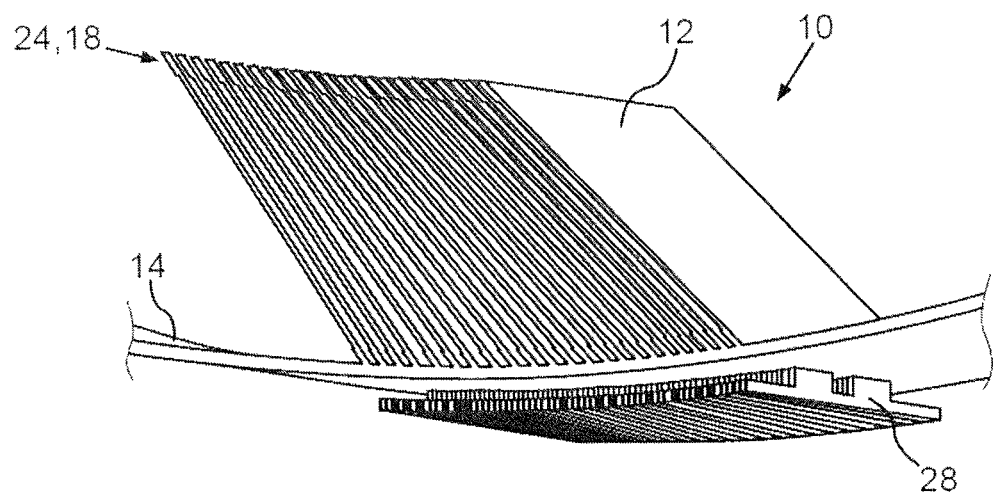
FIG. 2 shows a schematic perspective view of another exemplary embodiment of the leaf seal according to the invention.

FIG. 2 shows a schematic perspective view of another exemplary embodiment of the leaf seal 10 according to the invention. Contrary to the exemplary embodiment shown in FIG. 1, the support structure 16 has been removed, so that the end areas 18 of the leaves 12 can be moved relative with respect to one another. One can further see that the basic element 14 is formed elastically and in the shape of an annular segment, whereby the leaf seal 10 can be particularly quickly and easily arranged in an annular-shaped housing (not shown) of a gas turbine. In order to fasten the leaf seal 10 on the housing of the gas turbine, the basic element 14 has a plurality of fasteners 28, on its side facing away from the leaves 12, which were integrally formed together with the leaf seal 10 or the basic element 14 and which can also be freely varied with respect to quantity, arrangement, and geometry by the generative production process. In the exemplary embodiment shown, the fasteners 28 are pushed into a corresponding receptacle of the assigned housing and secured into position.

Figure 3:
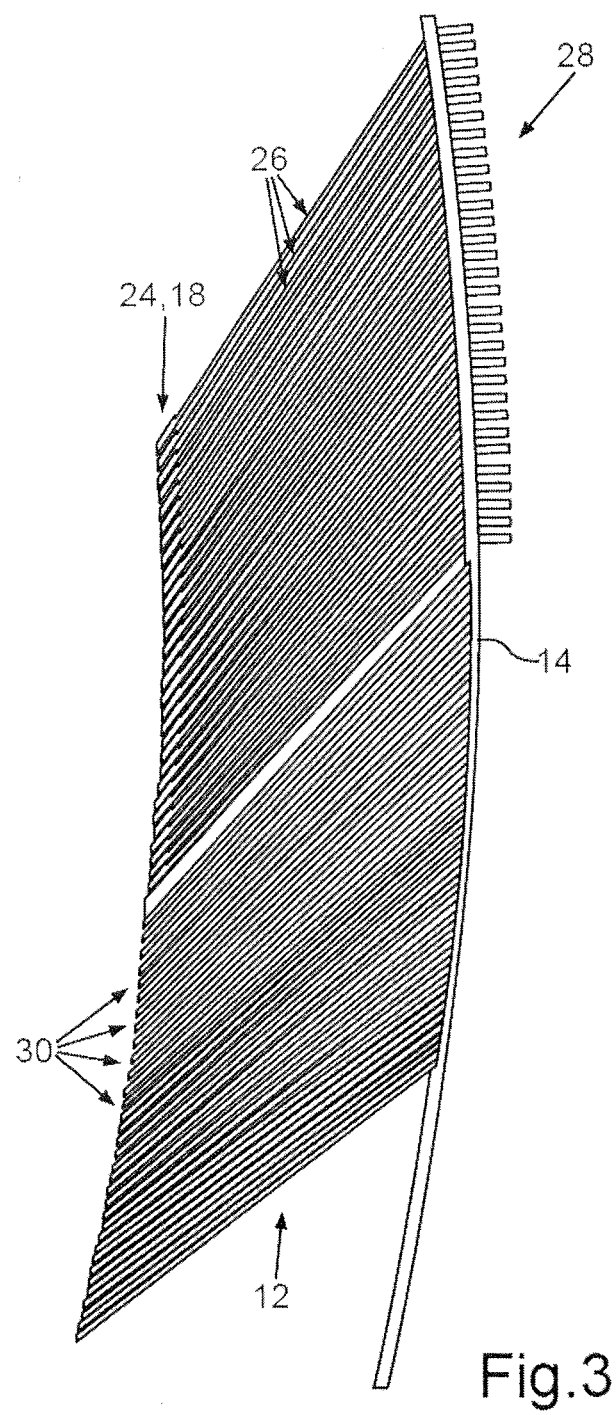
FIG. 3 shows a schematic side view of another exemplary embodiment of the leaf seal according to the invention.
Figures 4, 5:
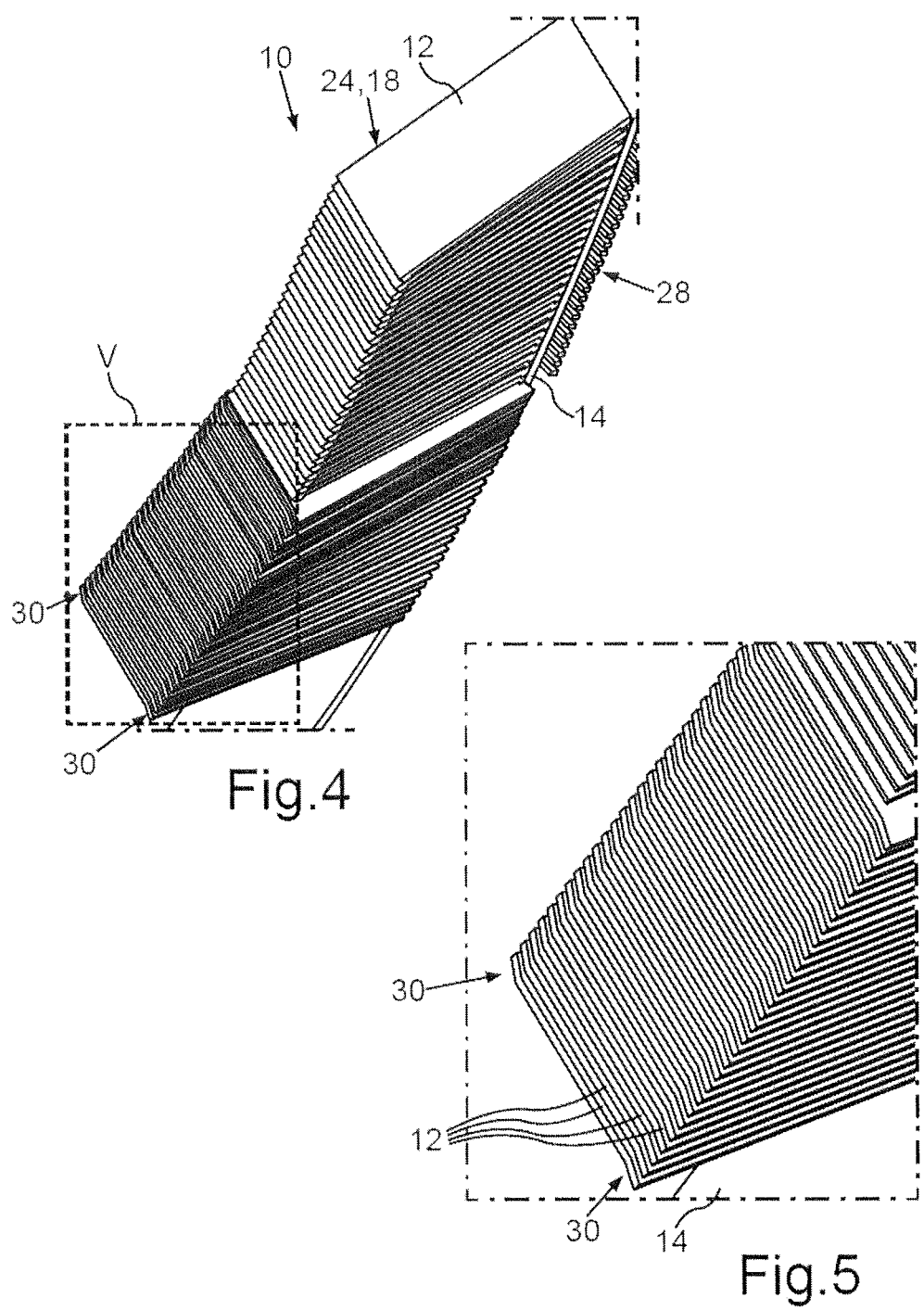
FIG. 4 shows a perspective view of the leaf seal shown in FIG. 3.
FIG. 5 shows an enlargement of detail V shown in FIG. 4.

FIG. 3 shows a schematic side view of another exemplary embodiment of the leaf seal 10 according to the invention. FIG. 3 will be explained in the following, when viewed together with FIG. 4 and FIG. 5, in which FIG. 4 shows a perspective view of the leaf seal 10 shown in FIG. 3 and FIG. 5 shows an enlargement of detail V shown in FIG. 4. It can be seen that a part of the leaves 12 have upstream and downstream winglets 30, meaning that they have lateral end areas placed at a respective adjustment angle toward the front and toward the rear. The winglets 30 in this case can have essentially any geometry and surfaces. In addition, a provision may be that the upstream and/or downstream winglets 30 have differently sized adjustment angles. In the exemplary embodiment shown, the leaves 12 have winglets 30 additionally with a larger width than those leaves 12 that were produced without winglets 30. As an alternative however, all of the leaves 12 can of course have the same width or leaves 12 without winglets 30 can have a larger width than leaves 12 with winglets 30. The winglets 30 increase the sealing effect of the leaf seal 10, because they partially block straight-line passageway for the gas flow in the axial direction and reroute the flow of gas. Thereby, they represent a type of labyrinth seal, in which it should be emphasized that a certain residual gap always remains between the individual leaves 12—with or without winglet(s) 30.

FIG. 6 shows a schematic side view of another exemplary embodiment of the leaf seal 10 according to the invention, in which the support structure 16 shown in FIG. 1 has been removed. It can be further seen that the placement angle α of the leaves 12 has been selected differently compared to FIG. 1 in order to ensure better adaptation to the deviating installation situation of the leaf seal 10.

LIST OF REFERENCE CHARACTERS

10 Leaf seal
12 Leaf
14 Basic element
16 Support structure
18 End area
20 End area
22 Cross-sectional thickness
23 Distance
24 Spacer element
26 Gap
28 Fastening means
30 Winglet
α Placement angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A leaf seal to seal off a shaft rotating around an axis, comprising:
    a plurality of leaves arranged spaced apart from one another; and
    an outer shroud that supports the plurality of leaves; wherein
    the plurality of leaves are formed together with the outer shroud as a unitary element by a generative production process; and
    the plurality of leaves have recesses forming first end areas of reduced cross-sectional thicknesses defining notches adjacent the outer shroud, and second end areas of increased cross-sectional thicknesses, located opposite the first end areas, defining spacer elements adjacent ends of the plurality of leaves situated away from the outer shroud.

2. The leaf seal according to claim 1, wherein said second areas of increased cross-sectional thickness maintain minimum distances between adjacent leaves.

3. The leaf seal according to claim 1, wherein at least one leaf of the plurality of leaves is arranged at an acute angle with respect to a longitudinal axis of the outer shroud.

4. The leaf seal according to claim 1, wherein the outer shroud includes a fastener and wherein the leaf seal is fastenable to a component by the fastener.

5. The leaf seal according to claim 4, wherein the fastener is disposed at a side of the outer shroud facing away from the plurality of leaves.

6. The leaf seal according to claim 4, wherein the fastener is produced integrally with the outer shroud by the generative production process.

7. The leaf seal according to claim 1, wherein at least one leaf of the plurality of leaves has a winglet at an upstream and/or a downstream end area.

8. The leaf seal according to claim 1, wherein the outer shroud is elastically deformable and/or is shaped as an annular segment in a longitudinal section.

* * * * *